(12) United States Patent
Wu

(10) Patent No.: US 11,954,194 B1
(45) Date of Patent: Apr. 9, 2024

(54) ARTIFICIAL REALITY ENCRYPTION AND DECRYPTION

(71) Applicant: UIPCO, LLC, San Antonio, TX (US)

(72) Inventor: Huihui Wu, Grapevine, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 377 days.

(21) Appl. No.: 17/489,757

(22) Filed: Sep. 29, 2021

Related U.S. Application Data

(60) Provisional application No. 63/085,685, filed on Sep. 30, 2020.

(51) Int. Cl.
| | | |
|---|---|---|
| G06F 21/71 | (2013.01) | |
| G06F 21/32 | (2013.01) | |
| G06F 21/60 | (2013.01) | |
| G06F 21/62 | (2013.01) | |
| G06T 19/00 | (2011.01) | |
| G06V 30/414 | (2022.01) | |
| G06F 21/64 | (2013.01) | |

(52) U.S. Cl.
CPC .......... *G06F 21/32* (2013.01); *G06F 21/602* (2013.01); *G06T 19/006* (2013.01); *G06V 30/414* (2022.01)

(58) Field of Classification Search
None
See application file for complete search history.

(56) References Cited

U.S. PATENT DOCUMENTS

| | | | |
|---|---|---|---|
| 2006/0072144 A1* | 4/2006 | Dowling | G06F 21/606 358/1.15 |
| 2013/0305059 A1* | 11/2013 | Gormley | G07F 7/08 713/189 |
| 2019/0089702 A1* | 3/2019 | Bhatt | H04L 63/0884 |

OTHER PUBLICATIONS

A Semi-Fragile Watermarking Scheme for Gray Scale Image Authentication Based On Self Embedding Mechanism with Improved Recovery of Original Work . Hassan. (Year: 2008).*
Stegano-Image as a Digital Signature to Improve Security Authentication System in Mobile Computing. Manotoro. ICIC. (Year: 2016).*

(Continued)

*Primary Examiner* — Venkat Perungavoor
(74) *Attorney, Agent, or Firm* — Potomac Law Group, PLLC; Dannon G. Allbee

(57) ABSTRACT

Embodiments described herein disclose methods and systems for encryption and decryption of data. In some implementations, an encryption and decryption system can protect private information of a user in documents with an artificial reality device. The encryption and decryption system can determine the portion of a document containing private information and encrypt that portion of the document. In some implementations, the encryption and decryption system can receive a document and identify the protected (e.g., encrypted) portion of the document. In some cases, the protected portion of the document can contain a security token that the encryption and decryption system can extract. The system can compare the security token to an authentication token associated with the user and determine whether the security and authentication token match. If the tokens match, the system can decrypt the protected portion of the document and display the decrypted data as a virtual object.

20 Claims, 10 Drawing Sheets

(56) References Cited

OTHER PUBLICATIONS

Robust and Adaptive Watermarking Technique for Digital Images. Sandaruwan. IEEE. (Year: 2017).*
Marks: An iris code embedding system for ownership identification of multimedia content. Umar. ELsevier. (Year: 2017).*

* cited by examiner

ARTIFICIAL REALITY ENCRYPTION AND DECRYPTION

CROSS-REFERENCE TO RELATED APPLICATION

This application is a non-provisional of and claims priority to U.S. Provisional Application No. 63/085,685, filed on Sep. 30, 2020, entitled "ARTIFICIAL REALITY ENCRYPTION AND DECRYPTION," which is hereby incorporated by reference in its entirety for all purposes.

TECHNICAL FIELD

The present disclosure is directed to increasing security and privacy in documents through artificial reality encryption and decryption.

BACKGROUND

Paper and electronic documents are frequently sent containing unprotected, sensitive information. This information can be viewed by unintended recipients, making it vulnerable to theft. Some secured transmission mediums exist for digital documents, such as by encrypting files and using secured email systems. However, these systems are difficult and frustrating for uses and fail to provide any solution for paper documents.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
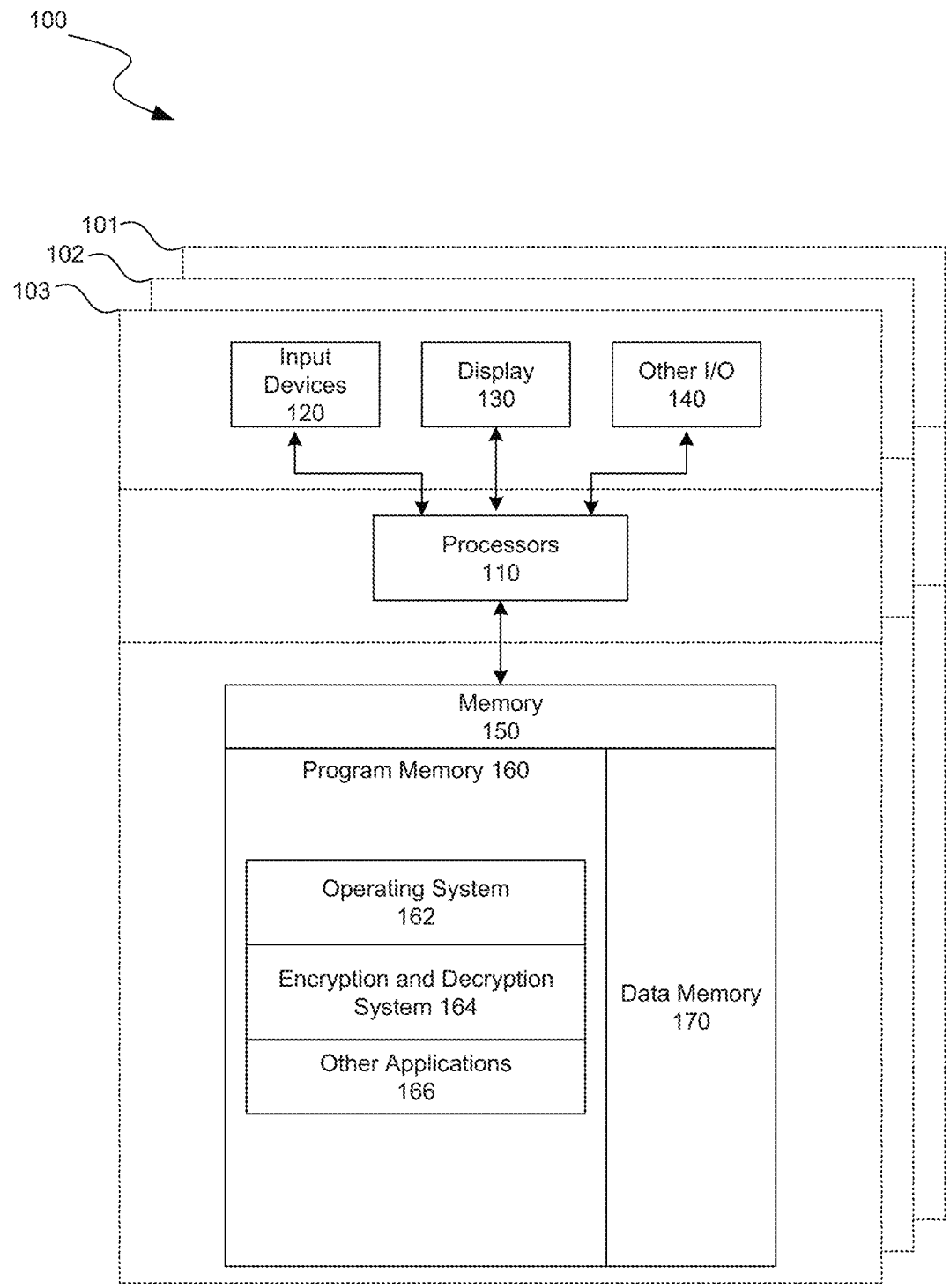
FIG. 1 is a block diagram illustrating an overview of devices on which some implementations of the present technology can operate.

Aspects of the present disclosure are directed to increasing security of private information in documents through the encryption of the private information and decryption by an artificial reality device. Documents (electronic or physical), such as financial or insurance documents, can contain personal identifiable information that can be detrimental to a user if the information were stolen. Thus, an encryption and decryption system that encrypts/decrypts portions of either electronic or physical documents containing private information is needed. As used herein, "private information" can be any information a user (individual, organization, group, company, etc.) wishes to keep secure, such as social security numbers, driver's license number, account numbers, passport number, email address, security information, classified information, etc.

In some implementations, an encryption and decryption system can encrypt private information to be decrypted by an artificial reality device (e.g., augmented reality glasses). In some cases, it is unnecessary to encrypt an entire document. The encryption and decryption system can receive a document and identify the protected (e.g., encrypted) portion of the document. In some cases, the protected portion of the document can contain a security token that the encryption and decryption system can extract. The system can compare the security token to an authentication token associated with the user (recipient or sender) and determine whether the security and authentication token match. If the tokens match, the system can decrypt the protected portion of the document and display the decrypted data as a virtual object.

For example, a user can receive a paper letter from her bank specifying her account number. However, instead of showing the account number in plain text, a code can be shown that is an encrypted version of the account number. The user can view the document through artificial reality glasses. The glasses can recognize that part of the document has an encrypted code with a corresponding security token. The artificial reality glasses can authenticate the user to obtain an authentication token (e.g., decryption key), decrypt the code, and present the account number as a virtual object, allowing the user to see her account number over the document.

The encryption and decryption system can also allow a user to control who has access to the user's data. A user can access an application that allows the user to digitally replace parts of a document with and encrypted version, associated with a security token that specifies individual, groups, or positions that are allowed to decrypt the content. For example, a user may want to mail a document containing her social security number to a company. However, she may only want the human resources department at the company to be able to see that private information. She can first load a digital version of the document onto her local device (e.g., mobile phone, laptop, artificial reality device, etc.) and load an encryption application. The user can specify the company, or the application can be associated with the company, and the encryption application can access information such as departments within the company. The user can select the human resources department and which part of the document contains her social security number. The application can encrypt that portion of the document with a security token that only allows a decryption key to be accessed by members of the human resources department. The user can then print and mail that version of the document. When the letter arrives at the company, only members of the human resources department will be able to, via their artificial reality device, view the decrypted version of the content (using the process from the previous example), even as the letter passes through multiple other hands.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Methods and systems disclosed herein can provide technical advantages over conventional encryption and decryption systems. Various embodiments employ the technical means of identifying encrypted or protected portions of a document with artificial reality devices and ensuring the encrypted portion is only decrypted if an authentication token of the recipient matches the security token designated by the sender. For example, the encryption and decryption system can provide one or more of the following technological improvements: 1) encrypting protons of a document containing private information; 2) embedding a security token in the encrypted portion of the document; 3) requiring the authentication of the recipient of the document before the decryption occurs, e.g., to increase the security of the information; 4) protecting private information in a document from being stolen or viewed by unintended recipients; and 5) controlling who has access to private information, even when provided on paper documents.

Some existing systems encrypt or decrypt private data but do not verify the authentication of the recipient, much less do existing systems use artificial reality glasses to identify protected portions of the document and extract security tokens embedded in the protected portion. Nor do they allow the user to see a decrypted version of content items merely by looking at them. The encryption and decryption system and processes described herein provided a solution for increased security regarding encrypted information. For example, data is only decrypted if the authentication token of the recipient matches the security token embedded in the protected portion of the data. The security token can be tailored to prevent everyone except the specified recipient to decrypt and view the protect portion of the document.

Several implementations are discussed below in more detail in reference to the figures. FIG. 1 is a block diagram illustrating an overview of devices on which some implementations of the disclosed technology can operate. The devices can comprise hardware components of a computing system 100 that encrypt and decrypt data. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device, Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices, A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, encryption and decryption system 164, and other application programs 166. Memory 150 can also include data memory 170 that can include personal data, token data, encrypted and decrypted data, security data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
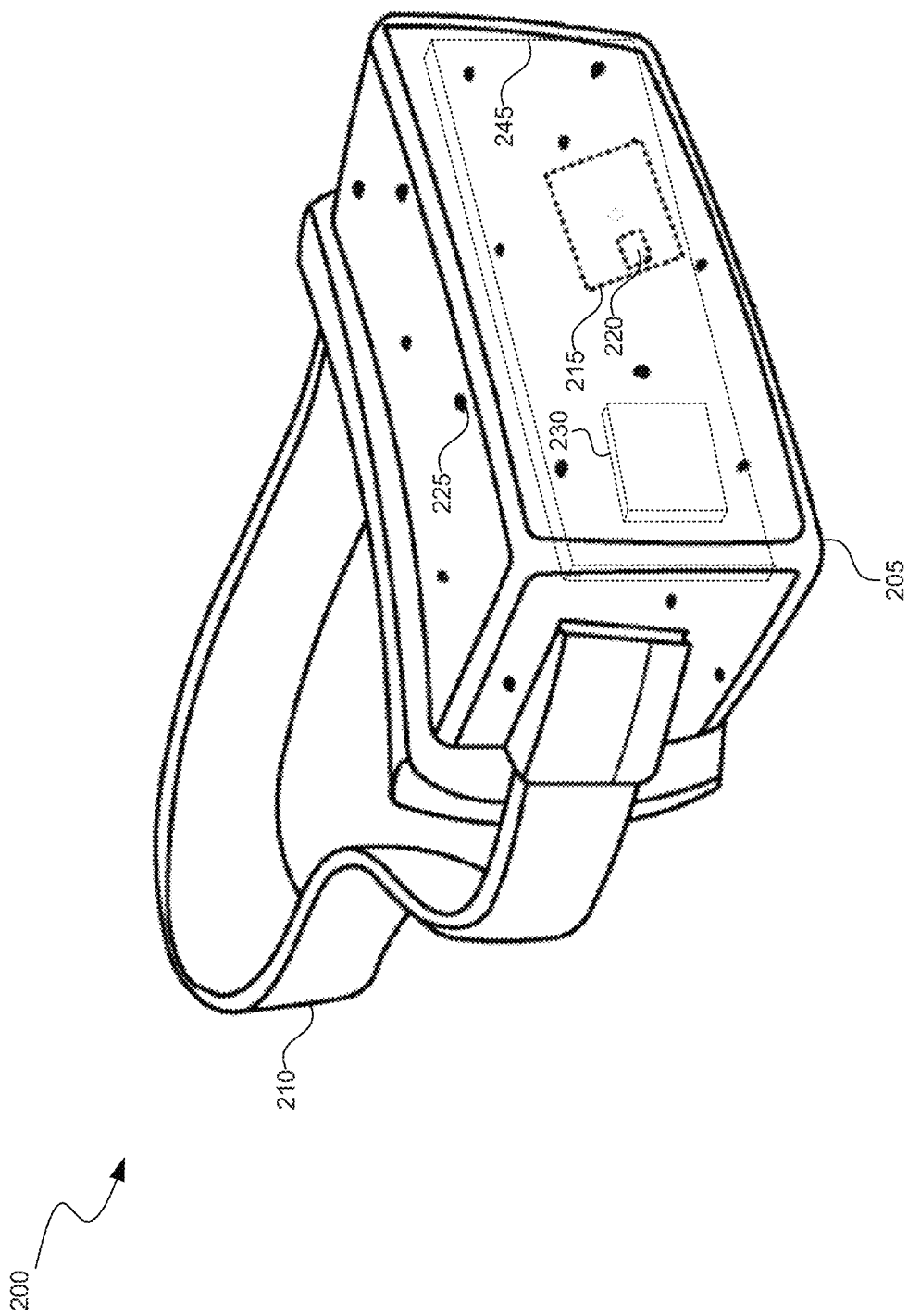
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (NU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

In some implementations, the HMD 200 can be in communication with one or more other external devices, such as controllers (not shown) which a user can hold in one or both hands. The controllers can have their own IMU units, position sensors, and/or can emit further light points. The HMD 200 or external sensors can track these controller light points. The compute units 230 in the HMD 200 or the core processing component can use this tracking, in combination with IMU and position output, to monitor hand positions and motions of the user. The controllers can also include various buttons a user can actuate to provide input and interact with virtual objects. In various implementations, the HMD 200 can also include additional subsystems, such as an eye tracking unit, an audio system, various network components, etc. In some implementations, instead of or in addition to controllers, one or more cameras included in the HMD 200 or external to it can monitor the positions and poses of the user's hands to determine gestures and other hand and body motions.

Figure 2B:
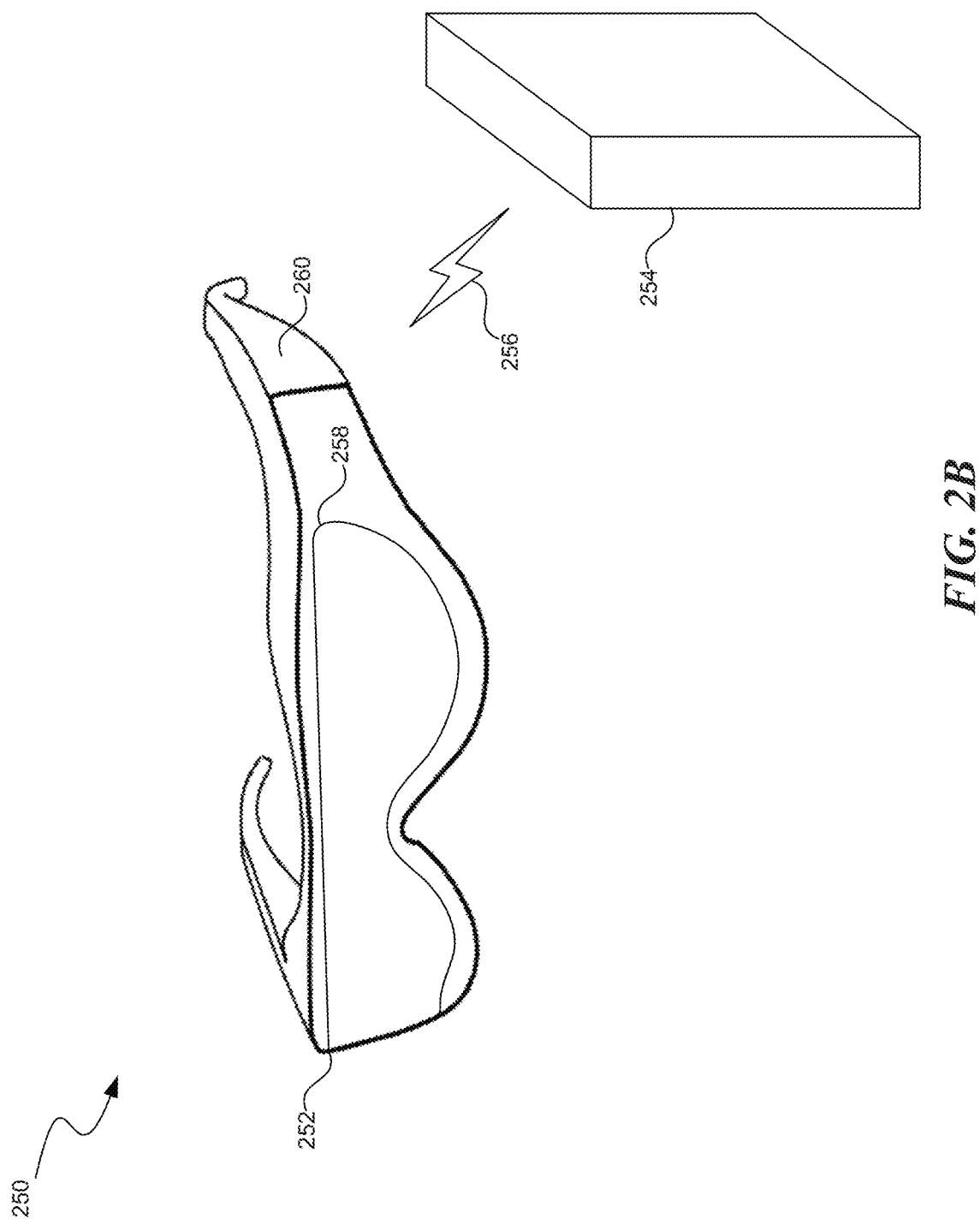
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors. MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 3:
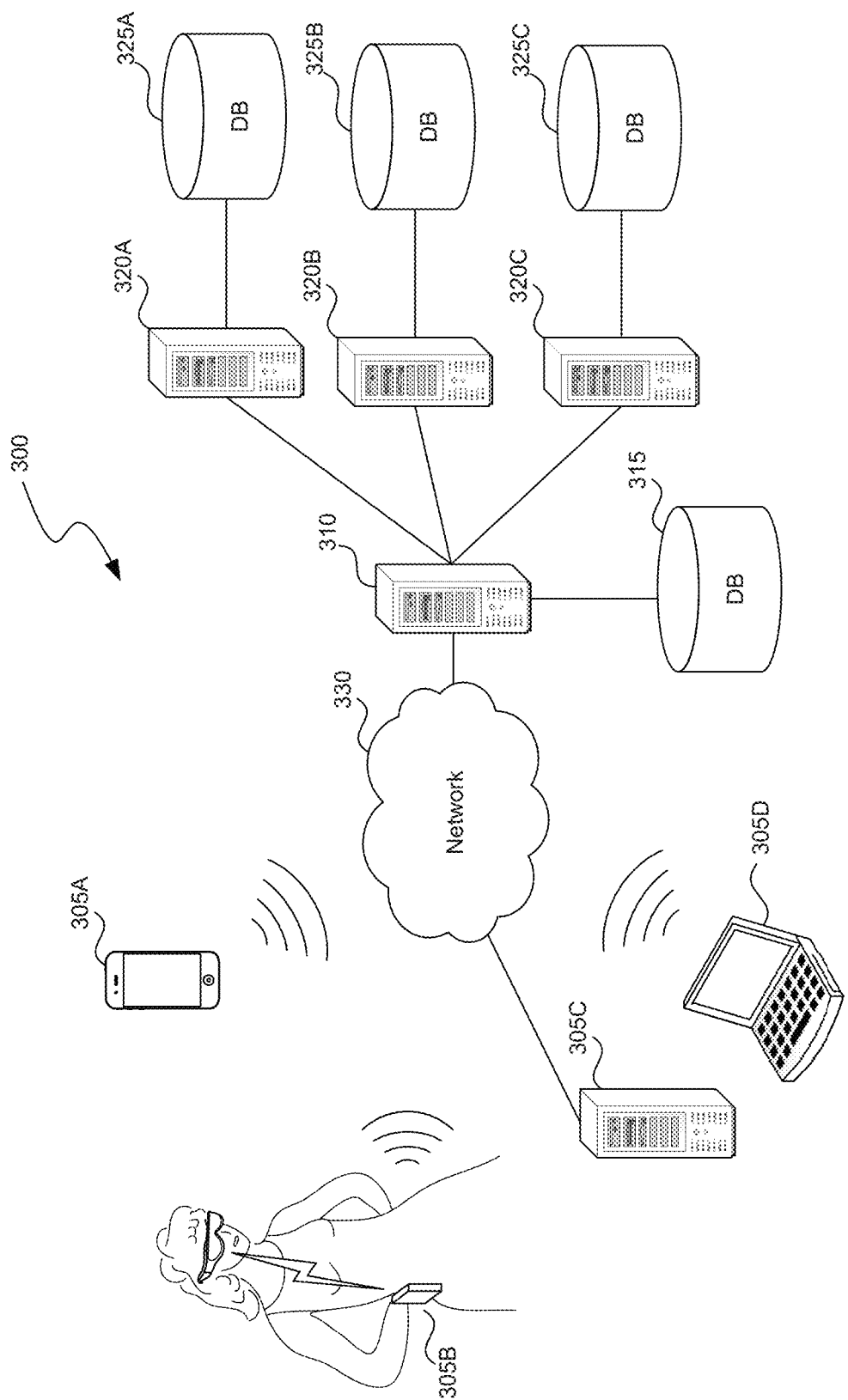
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
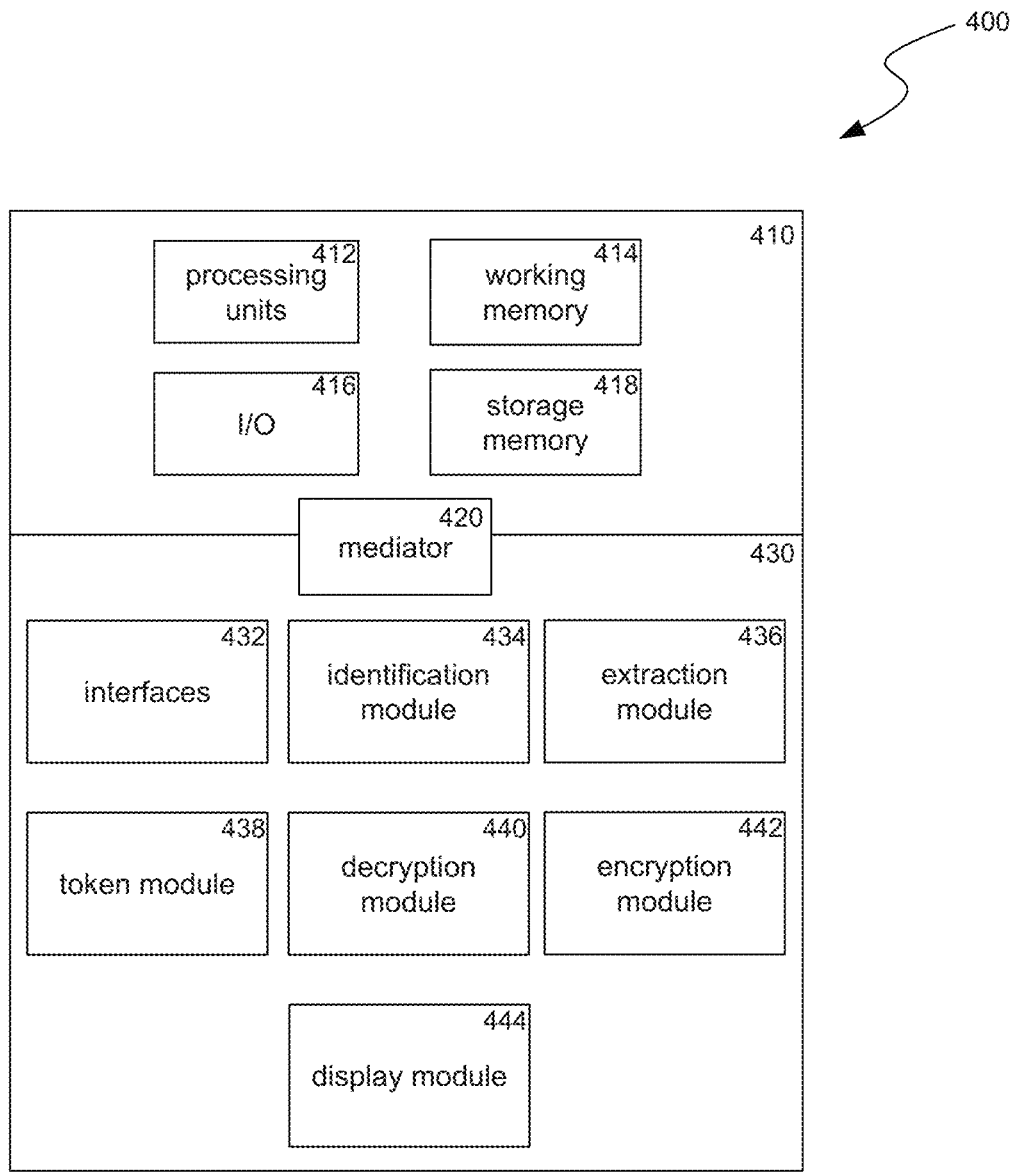
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems. Specialized components 430 can include identification module 434, extraction module 436, token module 438, decryption module 440, encryption module 442, display module 444, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

In some implementations, identification module 434 is configured to identify protected portions of a document containing encrypted data. Identification module 434 can identify or detect tags corresponding to the start or end of the protected portion in a document or can employ machine learning to identify encrypted portions without pre-determined tags. In some cases, identification module 434 is configured to identify the portion of a document that needs to be encrypted. Additional details on the identification of portions of a document are provided below in relation to block 504 of FIG. 5 and block 604 of FIG. 6.

In some implementations, extraction module 436 is configured to extract a security token embedded in the protected portion of the document. Additional details on extracting a security token are provided below in relation to block 506 of FIG. 5.

In some implementations, token module 438 is configured to determine whether the security token matches an authentication token associated with a user. In some cases, token module 438 is configured to embed the security token in the protected portion of a document. In other cases, token module 438 is configured to generate the authentication token by obtaining user information, confirming the identity of the user, and generating the authentication token, Additional details on the tokens are provided below in relation to block 508 of FIG. 5, block 606 of FIG. 6, and FIG. 7.

In some implementations, decryption module 440 is configured to decrypt data in the protected portion of a document. In some implementations, encryption module 442 is configured to encrypt the identified portion of the document according to security parameters. In various implementations, the decryption module 440 and/or encryption module 442 use RSA or other public/private key encryption/decryption schemes. Additional details on decrypting data are provided below in relation to block 510 of FIG. 5 and additional details on encrypting data are provided below in relation to block 608 of FIG. 6.

In some implementations, display module 444 is configured to display, by an artificial reality device, the decrypted data (from decryption module 440) to the user as a virtual object. In some cases, display module 444 is configured to provide the document with protected portions for transportation (electronic or physical). Additional details on the displaying data are provided below in relation to block 512 of FIG. 5, and block 610 of FIG. 6.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
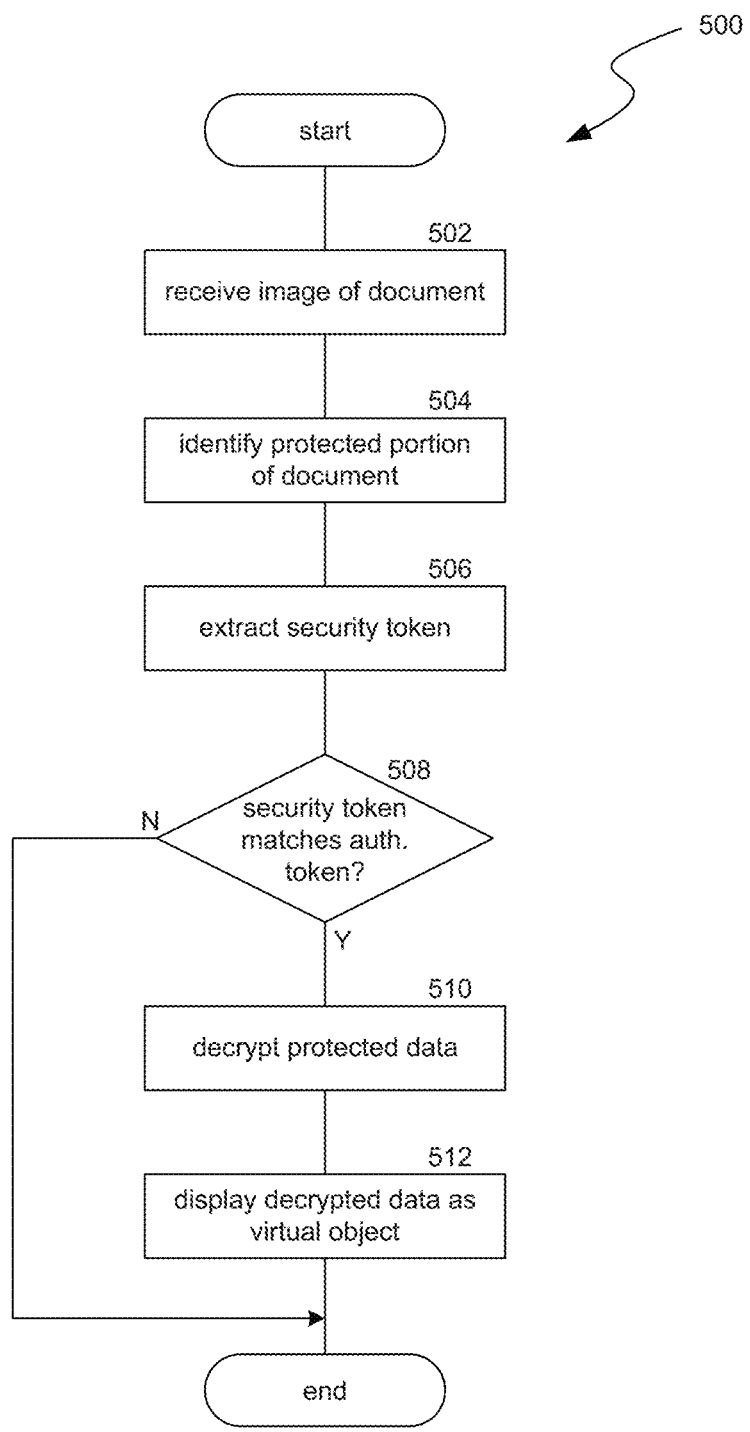
FIG. 5 is a flow diagram illustrating a process used in some implementations of the present technology for artificial reality document decryption.

FIG. 5 is a flow diagram illustrating a process 500 used in some implementations for document decryption. In some implementations, process 500 can be performed by an artificial reality device periodically, e.g., when the artificial reality device identifies that there is a document in the user's field of view. In other cases, process 500 can be performed in response to a user command, e.g., when the user activates a control when looking at a document with encrypted content.

At block 502, the process 500 can receive an image of a document containing encrypted data. In various implementations, the image of the document can be a picture of a piece of paper or a digitally presented document (e.g., on a screen, a virtual object, etc.) In some cases, process 500 may capture a portion of the document such as an identifier in the document (e.g., identify a hyper link, machine code (e.g., bar/QR code), or uniform resource identifier (URI) in the document). Process 500 can retrieve a digital version of the document based on the identifier.

At block 504, the process 500 can identify a protected portion of the document containing the encrypted data. In some implementations, process 500 may use a machine learning model to convert the image of the document into a 3D model. Process 500 can perform text recognition and/or bar/QR code decoding as initial steps when identifying the protected portion of the document. In some cases, the protected portions of the document can have special identifiers to specify which portions are encrypted. For example, process 500 can detect a first tag corresponding to the start of the protected portion of the document and a second tag corresponding to the end of the protected portion of the document.

In some implementations, process 500 may use a machine learning encryption recognition model to identify protected portions of a document. The encryption recognition model can be trained using previously encrypted documents that have the special character identifiers. For example, a document can contain an identifier (or multiple identifiers) which indicate the location and length of the protected portion of the document.

A "machine learning model" or "model" as used herein, refers to a construct that is trained using training data to make predictions or provide probabilities for new data items, whether or not the new data items were included in the training data. For example, training data for supervised learning can include positive and negative items with various parameters and an assigned classification. A new data item can have parameters that a model can use to assign a classification to the new data item. As another example, a model can be a probability distribution resulting from the analysis of training data, such as a likelihood of an event occurring in a given timeframe based on an analysis of a large corpus of events with corresponding times. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, an encryption recognition model can be a neural network with multiple input nodes that receive an image of a document. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input that, once the model is trained, can be used as a user product preference. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

The encryption recognition model can be trained with supervised learning, where the training data includes the positive and negative training items as portions of documents tags as having or not having encrypted data, Output from the model (an indication of whether the mod& identifies the portion of the document as having encrypted content) can be compared to the desired output (the tags corresponding to the input), and based on the comparison, the mod& can be modified, such as by changing weights between nodes of the neural network or parameters of the functions used at each node in the neural network (e.g., applying a loss function). After applying each of the document portion/encryption identifier pairings in the training data, the mod& is trained to evaluate new document portions to identify if they include encrypted data.

Process 500 can also keep track of where on the document the encrypted data was located as a world-locked location in an artificial reality environment controlled by an artificial reality device. This world locked anchor point can be updated as the artificial reality device and/or document move so, from the perspective of the artificial reality device, the anchor remains "pinned" to that spot on the document. This anchor point can be used by block 512 to show the unencrypted version of the data.

At block 506, the process 500 can extract a security token embedded in the protected portion of the document. In some implementations, the security token can specify: who (individual, groups, positions, etc.) can access the protected data, a level of confidence in user identification needed (e.g., confidence factor from block 704 of FIG. 7), and/or an access level need by the user.

At block 508, the process 500 can determine whether the security token matches an authentication token associated with a user. In some implementations, the match between the authentication token features (from FIG. 7) to the security token can require identification, identification confidence, or an access level In some cases, if there is not a security token available, the user receiving the document can still be authenticated (e.g., by executing process 700 of FIG. 7).

At block 510, the process 500 can decrypt data in the protected portion of the document. Process 500 can decrypt the data in response to the determining that the security token matches the authentication token. In some cases, process 500 may only decrypt a section of the protected portion of data based on the security level in the authentication token of the user receiving the document. In other cases, process 500 can decrypt the data in response to authenticating the user receiving the document. Decrypting the data can include using a private key associated with the user or authentication token to decrypt data encrypted using a paired public key. Other known encryption/decryption techniques can also be used.

At block 512, the process 500 can display the decrypted data to the user as a virtual object. Process 500 can display the decrypted data as an overlay, so the user doesn't see the original encrypted data. In some cases, process 500 can display encrypted data next to or around decrypted data. This can include generating a virtual object by an artificial reality device that shows the unencrypted version of the data. The artificial reality device can place the virtual object in relation to the anchor point placed at block 504. This allows the artificial reality device to show the unencrypted content as an overlay, adjacent to, or otherwise to the position of the encrypted content.

Figure 6:
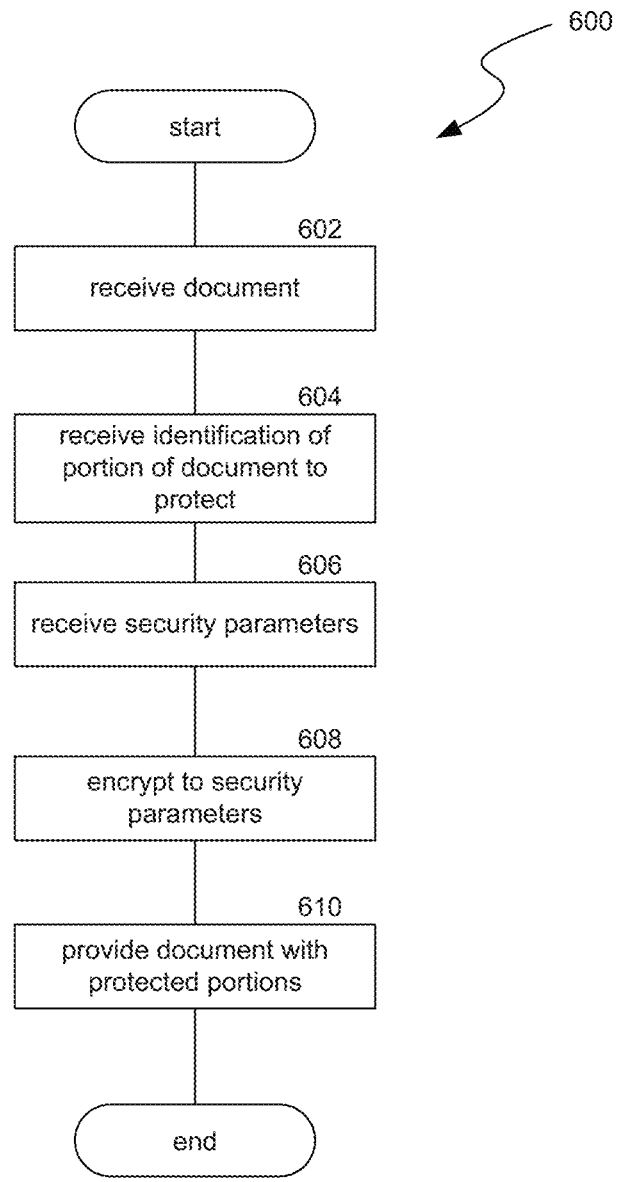
FIG. 6 is a flow diagram illustrating a process used in some implementations of the present technology for document encryption for use with an artificial reality device.

FIG. 6 is a flow diagram illustrating a process 600 used in some implementations for document encryption. In some implementations, process 600 can be performed when a user selects a document to encrypt. In some cases, process 600 can be performed by an artificial reality device—allowing a user to view a document in an artificial reality environment and select a portion to encrypt. Process 600 can be run as a special application, or as an add-on to do as part of a printing flow or email sending flow.

At block 602, process 600 can receive a document (or version of the document) with some unencrypted data. The document can be an image of a document or a textual version. At block 604, the process 600 can receive an identification of a portion of the unencrypted data, from the document, to protect. In some implementations, a user may select the text or outline the portion of document that needs to be protected, or trace it (e.g., using a ray cast in an artificial reality environment). In some cases, a machine learning model can identify the portion to protect (using techniques similar to those described at block 504 of FIG. 5) where the system identifies data similar to data others have identified as requiring encryption.

At block 606, the process 600 can receive security parameters associated with the identified portion of the document. The security parameters can be the identification (e.g., identification confidence level required, or access level required) of people or groups that are to be allowed access the identified portion to protect. In some implementations, the user may specify people with particular classifications (e.g., the IT department can access, but not the marketing department) that can access the document. This gives a sending user control over their personal data, even after sending a document.

At block 608, the process 600 can encrypt the identified portion of the document according to the security parameters. In some implementations, process 600 can add (or embed) a security token as an unencrypted add-on to the encrypted portion of the document. At block 610, the process 600 can provide the document with protected portions for transportation (physical or electronic). For example, process 600 can print or provide a digital version (e.g., send over email, text, fax, etc.) of the document.

Figure 7:
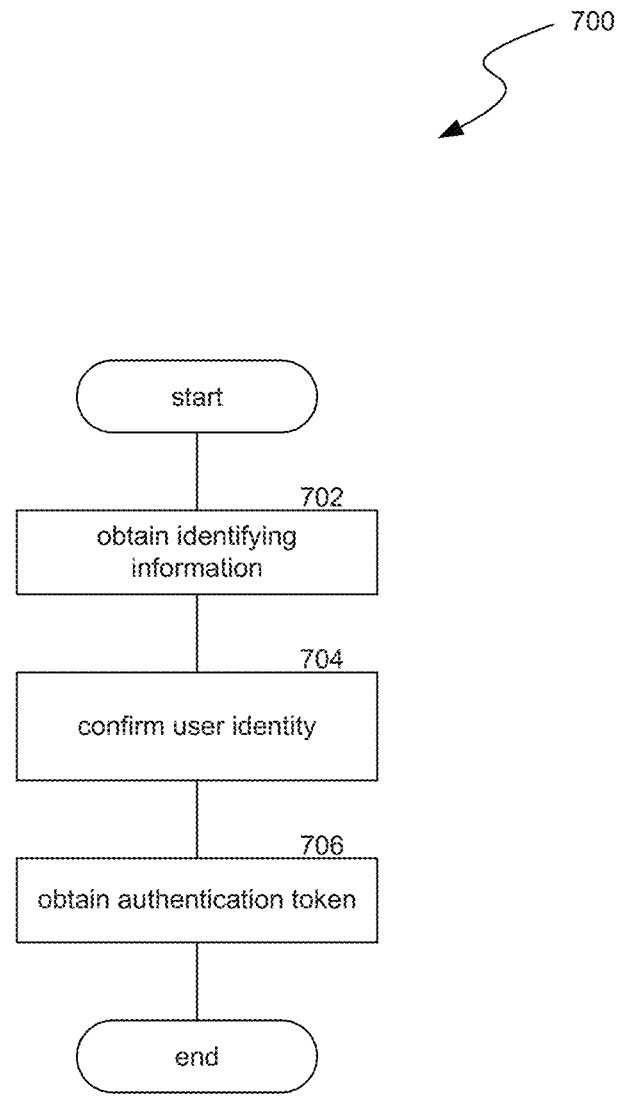
FIG. 7 is a flow diagram illustrating a process used in some implementations of the present technology for user authentication for document encryption or decryption.

FIG. 7 is a flow diagram illustrating a process 700 used in some implementations for document encryption or decryption. In some cases, process 700 can be in response to identifying a security token (as described in block 508 of FIG. 5). In other cases, process 700 can be performed ahead of time, e.g., when a user puts on an artificial reality device, when the user executes a decryption program, etc.

At block 702, the process 700 can obtain identifying information (i.e., access credentials, password, or other authentication data) associated with a user. In some cases, the identifying information can be biometric data (e.g., iris scanning, voice recognition, fingerprint, face recognition, dental records, ear features, etc.) In some implementations, an artificial reality device can automatically gather this data, e.g., when the user puts on the artificial reality device, the device can use cameras or other sensors to gather authentication data.

At block 704, the process 700 can confirm an authentication of the user using the identifying information. The confirmation of the user's authentication can be based on a confidence score (e.g., how close the provided data is to the user template). In some cases, the type of authentication data provided can also factor in, such as a higher confidence score for iris scan than voice recognition). Process 700 can confirm the authentication of the user through a network connection or by connecting to a service that provides back the authentication token (which may include a decryption key).

At block 706, the process 700 can obtain the authentication token for encrypting or decrypting one or more portions in the document. The authentication token can specify identity, identify confidence level, or level of access the identified user is assigned. For example, the recipient may only be permitted to decrypt and view a section of the protected portion of the document based on their assigned access level.

Figure 8:
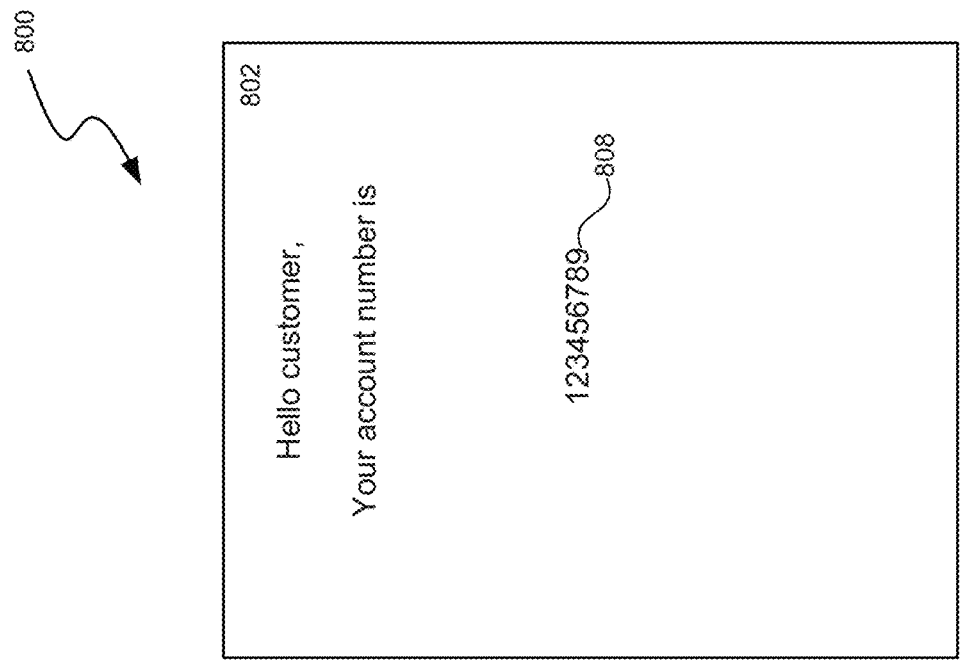
FIG. 8 is a conceptual diagram illustrating an example of artificial rea document decryption.
Figure 8:
Figure 8:
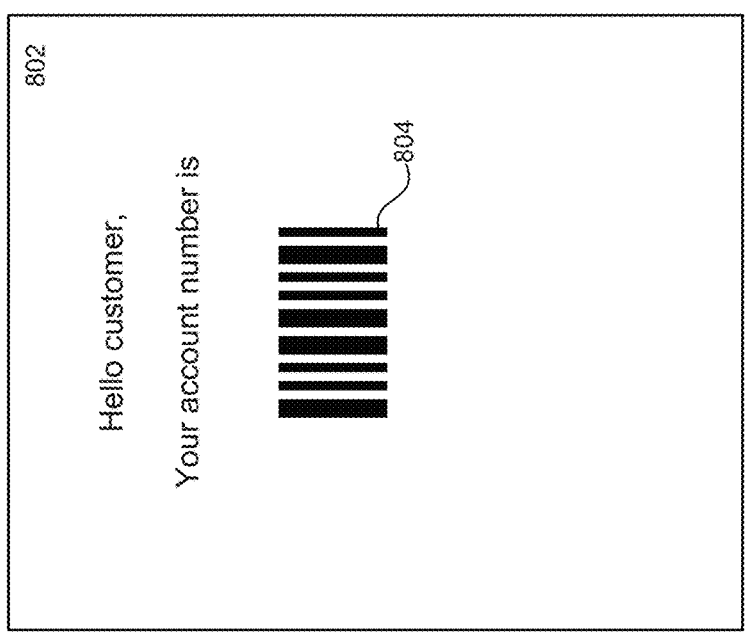

FIG. 8 is a conceptual diagram illustrating an example 800 of document decryption. Example 800 illustrates document 802 containing protected portion 804 (e.g., the private information of the customer has been encrypted and encoded into a barcode). The recipient of the document 802 can view the document with an artificial reality device. The artificial reality device can extract a security token from the protected portion 804 and compare it to an authentication token of the recipient. Upon a successful match of the tokens, the artificial reality device may decrypt the protected portion 804. The artificial reality device can then display the decrypted data 808 as a virtual object overlay, so the user only sees the unencrypted version. From the user's perspective, they simply looked at a document and can see the unencrypted content, while anyone else looking at the document sees a barcode.

Figure 9:
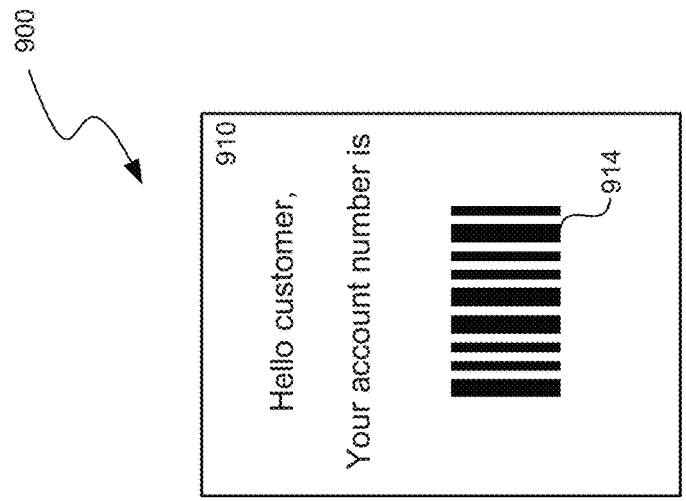
FIG. 9 is a conceptual diagram illustrating an example of an application for document encryption for use with an artificial reality device.
Figure 9:
Figure 9:
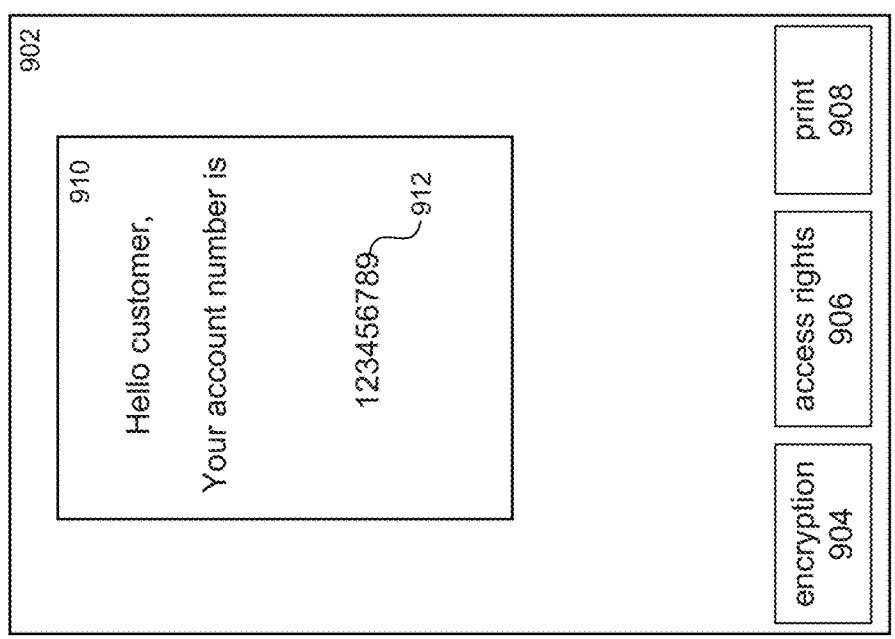

FIG. 9 is a conceptual diagram illustrating an example 900 of document encryption. Example 900 illustrates document 910 containing private information 912 (e.g., an account number, SSN, etc.) The sender of the document 910 may prepare the document 910 on a document processor window 902 or using an artificial reality device. The sender can select the private information 912 to protect and instruct the application to encrypt the information by pressing encryption button 904. In some cases, the sender can select persons, groups, etc. with viewing permission of the document by pressing access rights button 906. Once the document is prepared for transportation (physical or electronic) the sender may press print button 908 to print the document, create a PDF version, etc. The document 910 can be sent with the protected portion 914 replacing the private information 912.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method for document encryption, the method comprising:
   receiving, by an artificial reality device, an image of a document containing encrypted data;
   identifying a protected portion of the document containing the encrypted data;
   extracting a security token embedded in the protected portion of the document;
   determining whether the security token matches an authentication token associated with a user;
   in response to the determining that the security token matches the authentication token:
   decrypting data in the protected portion of the document; and
   displaying, by the artificial reality device, the decrypted data to the user as a virtual object.

2. The method of claim 1, wherein the document containing encrypted data was sent by a computing device which generated the document containing encrypted data by:
   receiving a version of the document with at least some unencrypted data;
   receiving an identification of a portion of the unencrypted data, from the document, to protect;
   receiving security parameters associated with the identified portion of the document;
   encrypting the identified portion of the document according to the security parameters; and
   providing the document with protected portions for transportation.

3. The method of claim 1, further comprising, prior to determining whether the security token matches the authentication token associated with a user:
   obtaining identifying information of the user;
   confirming an authentication of the user using the identifying information of the user; and
   based on the confirming, obtaining the authentication token for encrypting or decrypting one or more portions in the document.

4. The method of claim 1, wherein identifying the protected portion of the document further comprises:
   detecting a first tag corresponding to a start of the protected portion of the document; and
   detecting a second tag corresponding to an end of the protected portion of the document.

5. The method of claim 1, further comprising:
   decrypting a first section of the protected portion of the document based on a security level in the authentication token associated with the user.

6. The method of claim 1, wherein the security token identifies a security level of the user required to decrypt data in the protected portion of the document.

7. The method of claim 1,
   wherein the identification of the protected portion of the document is performed by a machine learning model trained to identify protected portions of documents, wherein the machine learning model was trained using indications of previously identified protected portions of documents.

8. A computing system for document encryption, the computing system comprising:
one or more processors; and
one or more memories storing instructions that, when executed by the one or more processors, cause the computing system to perform a process comprising:
receiving, by an artificial reality device, an image of a document containing encrypted data;
identifying a protected portion of the document containing the encrypted data;
obtaining a security token for the protected portion of the document;
determining whether the security token matches an authentication token associated with a user;
in response to the determining that the security token matches the authentication token:
decrypting data in the protected portion of the document; and
displaying, by the artificial reality device, the decrypted data to the user as a virtual object.

9. The computing system of claim 8, wherein the document containing encrypted data was sent by a computing device which generated the document containing encrypted data by:
receiving a version of the document with at least some unencrypted data;
receiving an identification of a portion of the unencrypted data, from the document, to protect;
receiving security parameters associated with the identified portion of the document;
encrypting the identified portion of the document according to the security parameters; and
providing the document with protected portions for transportation.

10. The computing system of claim 8, wherein the process further comprises, prior to determining whether the security token matches the authentication token associated with a user:
obtaining identifying information of the user;
confirming an authentication of the user using the identifying information of the user; and
based on the confirming, obtaining the authentication token for encrypting or decrypting one or more portions in the document.

11. The computing system of claim 8, wherein identifying the protected portion of the document further comprises:
detecting a first tag corresponding to a start of the protected portion of the document; and
detecting a second tag corresponding to an end of the protected portion of the document.

12. The computing system of claim 8, wherein the process further comprises:
decrypting a first section of the protected portion of the document based on a security level in the authentication token associated with the user.

13. The computing system of claim 8, wherein the security token identifies a security level of the user required to decrypt data in the protected portion of the document.

14. The computing system of claim 8, wherein the identification of the protected portion of the document is performed by a machine learning model trained to identify protected portions of documents.

15. A computer-readable storage medium storing instructions that, when executed by a computing system, cause the computing system to perform a process for document encryption, the process comprising:
receiving, by an artificial reality device, an image of a document containing encrypted data;
identifying a protected portion of the document containing the encrypted data;
determining security parameters required to access the protected portion of the document;
determining whether a user's authentication is sufficient to meet the security parameters;
in response to the determining that the user's authentication is sufficient to meet the security parameters:
decrypting data in the protected portion of the document; and
displaying, by the artificial reality device, the decrypted data to the user as a virtual object.

16. The computer-readable storage medium of claim 15, wherein displaying the decrypted data to the user as a virtual object comprises tracking a location of the encrypted data in the document and displaying the virtual object in relation to the tracked location of the encrypted data.

17. The computer-readable storage medium of claim 15, wherein the process further comprises, prior to determining whether the user's authentication is sufficient to meet the security parameters:
automatically obtaining, by the artificial reality device, biometric identifying information of the user comprising one or more of: an iris scan, a fingerprint, or a voice recognition; and
confirming an authentication of the user using the biometric identifying information.

18. The computer-readable storage medium of claim 15, wherein identifying the protected portion of the document further comprises:
detecting a first tag corresponding to a start of the protected portion of the document; and
detecting a second tag corresponding to an end of the protected portion of the document.

19. The computer-readable storage medium of claim 15, wherein the process further comprises:
decrypting a first section of the protected portion of the document based on a security level in the authentication token associated with the user.

20. The computer-readable storage medium of claim 15, wherein the security token identifies a security level of the user required to decrypt data in the protected portion of the document.

* * * * *